P. B. SHEE.
OILING DEVICE FOR BEARINGS OF CENTRIFULGAL CREAM SEPARATORS.
APPLICATION FILED OCT. 31, 1918.
1,402,544.
Patented Jan. 3, 1922.
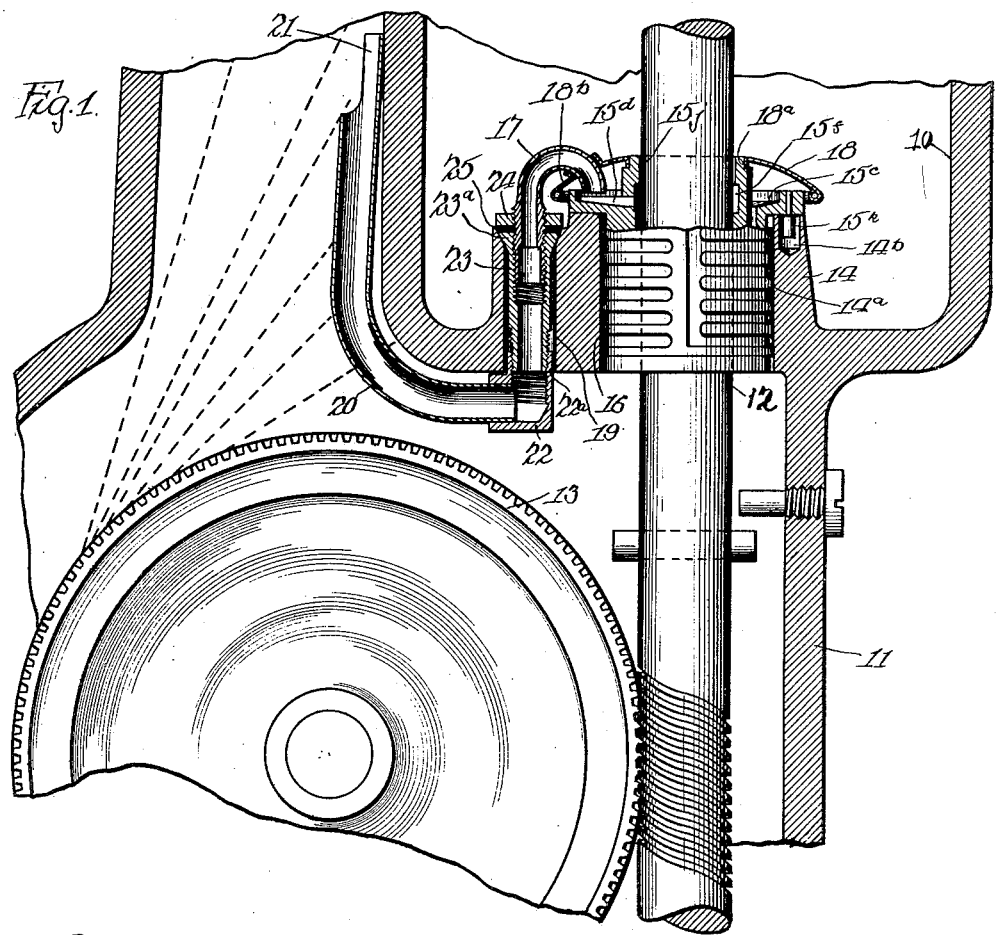
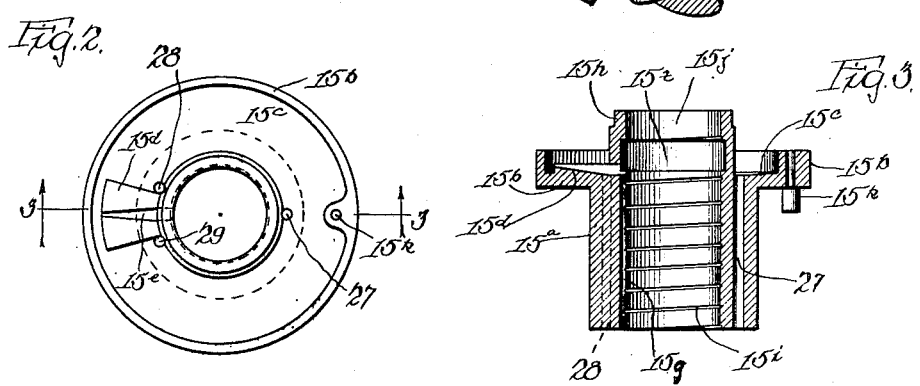

UNITED STATES PATENT OFFICE.

PARKE B. SHEE, OF OAK PARK, ILLINOIS, ASSIGNOR TO SEARS ROEBUCK AND COMPANY, A CORPORATION OF NEW YORK.

OILING DEVICE FOR BEARINGS OF CENTRIFUGAL CREAM SEPARATORS.

1,402,544.     Specification of Letters Patent.     Patented Jan. 3, 1922.

Application filed October 31, 1918. Serial No. 260,416.

*To all whom it may concern:*

Be it known that I, PARKE B. SHEE, a citizen of the United States, residing at Oak Park, in the county of Cook and State of Illinois, have invented certain new and useful Improvements in Oiling Devices for Bearings of Centrifugal Cream Separators, of which the following is a specification.

The invention relates to bearings for the vertical bowl spindles of cream separators and more particularly to improvements to adapt the upper bearing of said vertical bowl spindles of cream separators to be satisfactorily lubricated by the splash oiling system within the driving gear casing of the separator.

It is a further object of the invention to provide an improved form of oiling device for conducting splash oil from the gear casing to the upper end of the spindle bearing in the bowl housing, the said device being of an improved detachable construction so as to be readily removed for the purpose of cleaning or to permit the removal of its cooperating bearing.

It is a still further object of the invention to provide an improved construction of bearing for the vertical spindle of a cream separator, or machine having a like vertical spindle, whereby the bearing throughout may be satisfactorily lubricated whenever the vertical spindle is in operation.

Other objects of the invention will appear from the following description of the preferred form of the invention, which is also shown in the drawing forming a part of the specification and finally more particularly pointed out in the claims.

In the drawing Fig. 1 is a broken vertical sectional view through the integrally formed bowl casing of a common type of cream separators, showing the invention also in section applied to the upper end of the vertical bowl spindle.

Fig. 2 is a top plan view of the bearing with the cover thereof removed, and,

Fig. 3 is a vertical section through the bearing taken on line 3—3, Fig. 2.

The bowl casing is designated by the reference character 10 and is formed integrally with the machine frame 11 which latter is formed to provide a housing for the lower end of the bowl spindle 12 and driving gearing therefor of which the fragmental worm gear 13 forms a part for driving the spindle 12 by engaging the worm grooves thereon, all of these parts of the machine being of common standard construction.

The bowl casing 10 is formed in its bottom with a thickened portion centrally thereof forming a housing for the bearing as indicated by the reference character 14, which is bored at $14^a$ to provide for the passage therethrough of the vertical bowl spindle 12 and its upper bearing, the latter being designated by the reference character 15. The body portion $15^a$ of the bearing is cylindrical in form and centrally bored to receive the spindle. The cylindrical part $15^a$ is somewhat smaller than the bore $14^a$ of the support, and the upper end of the bearing is provided with an enlarged peripheral flange $15^b$ adapted to overlie the top of the housing 14 so that the bearing is adapted to have a relative sliding movement in the housing to permit centering or balancing movement of the bowl and spindle in operation under control of the cushioning and centering spring member 16 interposed between the part $15^a$ of the bearing and its support 14. The pin $15^k$ in the bearing flange $15^b$ cooperating with the enlarged opening $14^b$ in the support prevents undue rotation of the bearing 14 without preventing desirable limited shift of the bearing in relation to its support. The top of the flange $15^b$ is formed with a wide peripheral groove or pan $15^c$ for collecting lubricant from the supply or feed tube 17 and directing same to the bearing surfaces. $15^d$ is a table or ledge formed integral with the flange $15^b$ in the bottom of the groove or pan $15^c$ and a radial groove $15^e$ formed in the top thereof conducts lubricant falling therein to the enlarged inner peripheral groove $15^f$ and communicates also with the upper end of the vertical groove $15^g$ on the interior of the bearing. The upper extremity of the bearing is peripherally reduced as at $15^h$ to receive the depending flange $18^a$ surrounding the centrally perforated and curved cover plate 18, which is preferably spaced a short distance above and out of contact with the top of the bearing to prevent the escape of lubricant by capillary attraction which would be the result if the cover contacts with the bearing flange $15^b$.

The cover plate 18 is perforated and slotted at $18^b$ to receive the oil supply duct 17 and it will be apparent that lubricant from the duct entering the groove 15$^e$ will reach both the vertical groove 15$^g$ of the bearing as well as the peripheral groove 15$^f$ in both of which any surplus in the feed may accumulate to be subsequently carried downwardly along the shaft and bearing through the descending spiral groove 15$^i$ on the interior bearing surface, thus thoroughly lubricating every part of the shaft and bearing surfaces. To prevent the lubricant from travelling upwardly of the shaft and working out the top of the bearing an offset or check 15$^j$ is formed above the groove. The material above the groove 15$^f$ is cut away as at 15$^j$ to allow about two one-thousandths of an inch clearance between same and the shaft, since the part 15$^j$ will not receive lubrication.

An important feature of the invention resides in the construction of the oil collecting and supplying device which is made readily detachable for cleaning any obstructions in the oil passages or to enable the bearing to be removed from its support.

The material in the bottom of the bowl housing is thickened and perforated adjacent the bearing support 14 as indicated at 19. An oil duct or tube 20 is curved preferably to conform with the exterior of the bowl casing and the upper end is formed with an oil collecting device or spoon as indicated at 21, the upper extremity being above the highest point in the oil delivery tube 17 so that when the oil rises to the top of the tube 20 it will by gravity flow out through the duct 17. The oil sprayed by the wheel 13 will enter the collecting device and tube 20 and pass thence by gravity through the opening in the block 22 into the extension 22$^a$ of which is screw threaded the tubular member 23 having an enlarged conical upper end 23$^a$ cooperating with a conical seat on the support. The end 23$^a$ may be slotted to take a screw driver for turning this part in relation to the block 22 to lock the parts in perforation 19 and the part 23 is like the block longitudinally perforated and screw threaded to take the threaded lower end of the oil delivery tube 17, the latter being locked in relation to the part 23 by a threaded knurled hand nut 24, with preferably a resiliently paper or fiber washer 25 interposed. By providing some additional length to the threaded portions of tube 17 and part 23 the height of the delivery tube may be readily adjusted or varied by loosing the hand nut 24 and screwing the tube 17 up or down as desired and again locking it by the hand nut 24.

When the separator is operated obviously oil splashed in the tube 20 will cause an overflow through tube 17 onto the elevated portion or step 15$^d$ of the bearing and oil entering groove 15$^e$ therein will pass to the bearing surfaces by way of the peripheral and vertical grooves so that as long as the operation continues a supply of oil will be fed to the bearing surfaces. Such portions of the oil as do not enter the groove 15$^e$ pass into the bottom of collecting pan or groove 15$^c$ and thence back into the gear casing below through the vertical grooves 27, 28, 29 in the body of the bearing. (Figs. 2 and 3.)

I claim:

1. In a centrifugal separator, the combination with the bowl spindle and casing provided with an opening to receive the spindle, of a bearing in the opening surrounding the spindle, the said bearing comprising a cylindrical portion adapted to surround the spindle, an integral peripheral flange plate on the cylindrical bearing portion near the top thereof adapted to support the bearing in relation to the bowl casing, there being an oil collecting pan on the top of the said peripheral flange plate, and an oil duct formed integral with said pan and leading therefrom through the bearing wall to the inner surface of the bearing adjacent the spindle, and near the top part of the bearing surface whereby the entire bearing surface will be lubricated by the gravity of the lubricant.

2. In a centrifugal separator, the combination with the bowl spindle and casing provided with an opening to receive the spindle of a bearing in the opening surrounding the spindle, said bearing comprising a cylindrical portion adapted to surround the spindle, an integral peripheral flange plate on the cylindrical bearing portion near the top thereof adapted to support the bearing in relation to the bowl casing, there being an oil collecting pan on the top of the said peripheral flange plate with a duct leading therefrom through the wall of the bearing to the interior surface thereof adjacent the spindle, a cylindrical portion of reduced diameter forming a ledge at the upper extremity of the bearing, and a removable cap or cover plate having a central perforation for the spindle and being supported on the upper extremity ledge formed by the reduced cylindrical portion of the bearing.

3. In a centrifugal separator, the combination with the bowl spindle and casing provided with an opening to receive the spindle, of a bearing in the opening surrounding the spindle, the said bearing comprising a cylindrical portion adapted to surround the spindle, an integral peripheral flange plate on the cylindrical bearing portion near the top thereof adapted to support the bearing in relation to the bowl casing, there being an oil collecting pan on the top of the said peripheral flange plate, a table or ledge in the bottom of the collecting groove or pan on said plate, and an oil duct extending along the top of the table or ledge and through the wall of the cylindrical portion of the bearing to deliver oil to the bearing surfaces adjacent the spindle.

4. In a centrifugal separator, the combination with the bowl spindle and casing provided with an opening to receive the spindle, of a bearing in the opening surrounding the spindle, the said bearing comprising a cylindrical portion adapted to surround the spindle, an integral peripheral flange plate on the cylindrical bearing portion near the top thereof adapted to support the bearing in relation to the bowl casing, there being an oil collecting pan on the top of the said peripheral flange plate, a table or ledge in the bottom of the collecting groove or pan on said plate, an oil groove or duct extending along the top of the said table or ledge and through the wall of the cylindrical bearing portion to supply lubricant to the bearing spindle, there being also a circumferential groove around the interior of the bearing intersecting the said oil duct or groove through the wall of the spindle bearing portion and communicating therewith, and a vertical duct or groove extending from a point adjacent the intersection of the first said duct or groove and the inner circumferential groove and leading to the extreme lower end of the bearing.

5. In a centrifugal separator, the combination with the bowl spindle and casing provided with an opening to receive the spindle, of a bearing in the opening surrounding the spindle, the said bearing comprising a cylindrical portion adapted to surround the spindle, an integral peripheral flange plate on the cylindrical bearing portion near the top thereof adapted to support the bearing in relation to the bowl casing, there being an oil collecting pan on the top of the said peripheral flange plate provided with a duct formed integrally in said peripheral flange plate leading therefrom through the bearing wall to the interior surface of the bearing adjacent the spindle, a cover plate for the oil collecting groove or pan secured to the extreme upper end of the cylindrical bearing portion, there being an opening through said cover plate, and an oil supply pipe in said opening of the cover plate for discharging lubricant into the said oil collecting groove or pan in the bearing flange plate.

6. In a centrifugal separator, the combination with the bowl spindle and casing provided with an opening to receive the spindle of a bearing in the opening surrounding the spindle, the said bearing comprising a cylindrical portion adapted to surround the spindle, an integral peripheral flange plate on the cylindrical bearing portion near the top thereof adapted to support the bearing in relation to the bowl casing, a spring interposed between the support in the bowl casing and the bearing, there being an oil collecting pan on the top of the said peripheral flange plate provided with a duct leading to the interior surface of the bearing adjacent the spindle, an enlarged peripheral groove on the inner bearing surface intersecting the first said duct, and a vertical duct leading from the enlarged peripheral duct to the lower end of the bearing in the bearing surface thereof.

7. In a centrifugal separator, the combination with a bowl spindle and casing provided with an opening to receive the spindle, of a bearing in the opening surrounding the spindle, the said bearing comprising a cylindrical portion adapted to surround the spindle, an integral peripheral flange plate on the cylindrical bearing portion near the top thereof, adapted to support the bearing in relation to the bowl casing, there being an oil collecting pan on the top of the said peripheral flange plate, a table or ledge formed in the said collecting groove or pan and having the top surface thereof above the bottom of the groove or pan, there being a groove or duct leading from the top surface of the table or ledge through the wall of the bearing to the spindle bearing surface thereof, there being also an oil drain leading from the bottom of said oil collecting groove or pan through the cylindrical portion of the bearing and discharging therefrom into the interior of the gear casing below the bearing.

8. In a centrifugal separator, the combination with a bowl spindle and casing provided with an opening to receive the spindle, of a bearing in the opening surrounding the spindle, the said bearing comprising a cylindrical portion adapted to surround the spindle, an integral peripheral flange plate on the cylindrical bearing portion near the top thereof adapted to support the bearing in relation to the bowl casing, an oil collecting pan on the top of the said peripheral flange plate with an oil duct leading therefrom to the inner surface of the bearing adjacent the spindle, an enlarged peripheral groove formed on the interior of the bearing wall, and a helical oil groove formed in the inner surface of the bearing and leading from the said enlarged peripheral groove to the extreme lower end of the bearing.

9. In a centrifugal separator, the combination with a bowl spindle and casing provided with an opening to receive the spindle, of a bearing in the opening surrounding the spindle, the said bearing comprising a cylindrical portion adapted to surround the spindle, an integral peripheral flange plate on the cylindrical bearing portion near the top thereof adapted to support the bearing in relation to the bowl casing, an oil collecting pan on the top of the said peripheral flange plate with an oil duct leading therefrom to the inner surface of the bearing adjacent the spindle, an enlarged peripheral groove formed on the interior of the bearing wall, and a helical oil groove formed in the inner surface of the bearing and leading from the said enlarged peripheral groove to the extreme lower end of the bearing and intersecting a vertical groove leading from the said enlarged peripheral groove intersecting the first said oil duct and extending therefrom to the extreme lower end of the bearing and opening to discharge oil to the interior of the gear casing below.

10. In a centrifugal separator, the combination with a bowl spindle and casing provided with an opening to receive the spindle, of a bearing in the opening surrounding the spindle, the said bearing comprising a cylindrical portion adapted to surround the spindle, an integral peripheral flange plate on the cylindrical bearing portion near the top thereof adapted to support the bearing in relation to the bowl casing, there being an oil collecting pan on the top of the said peripheral flange plate with an oil duct leading therefrom to the interior surface of the bearing adjacent the spindle, and a device for supplying lubricant from the gear casing to the said oil collecting groove or pan comprising an oil collecting tube or duct arranged within the gear casing to receive oil splashed by the rotation of the gears therein and having an intake opening and collecting device above the top of the said peripheral flange plate in the gear chamber on the exterior of the bowl casing and passing thence downwardly to the bottom of the bowl casing and inwardly to a point adjacent the spindle bearing and thence upwardly through the bottom of the bowl casing to the top of the bearing and being provided at its upper extremity with a curved pipe for discharging oil downwardly into the collecting groove or pan of the peripheral flange plate, and means for detachably securing said oil supplying device in the bottom wall of the said bowl casing.

11. In a centrifugal separator, the combination with the bowl spindle and casing provided with an opening to receive the spindle, of a bearing in the opening surrounding the spindle, the said bearing comprising a cylindrical portion adapted to surround the spindle, an integral peripheral flange plate on the cylindrical bearing portion near the top thereof adapted to support the bearing in relation to the bowl casing, there being an oil collecting pan on the top of the said peripheral flange plate with an oil duct leading therefrom to the interior surface of the bearing adjacent the spindle, and a device for supplying lubricant from the gear casing to the said oil collecting groove or pan comprising an oil collecting tube or duct arranged within the gear casing to receive oil splashed by the rotation of the gears therein, and having an intake opening and collecting device above the top of the said peripheral flange plate passing from said collecting device through the bottom of the bowl casing being provided at its upper extremity with a curved pipe for discharging oil downwardly into the collecting groove or pan of the peripheral flange plate, and means for adjustably and detachably securing the said oil supplying device in the bottom wall of said bowl casing adjacent the spindle bearing.

12. In a centrifugal separator, the combination with a bowl spindle and casing provided with an opening to receive the spindle, of a bearing in the opening surrounding the spindle, the said bearing comprising a cylindrical portion adapted to surround the spindle, an integral peripheral flange plate on the cylindrical bearing adapted to support the bearing in relation to the bowl casing, there being an oil collecting pan on the top of the said peripheral flange plate with an oil duct leading therefrom to the interior of the bearing adjacent the spindle, and a device for supplying lubricant from the gear casing to the said oil collecting groove or pan comprising an oil collecting tube or duct arranged within the gear casing to collect oil splashed by the rotation of the gears therein, the said tube or duct extending from the interior of the gear casing through the wall of the bowl casing and being provided within the bowl casing with means for downwardly discharging oil into the collecting groove or pan of the peripheral flange plate, and means for detachably securing said oil supplying device to the wall of the bowl casing adjacent the spindle bearing.

13. In a centrifugal separator, the combination with the bowl spindle and casing provided with an opening to receive the spindle, of a bearing in the opening surrounding the spindle, an integral peripheral flange plate on the cylindrical bearing portion adapted to support the bearing in relation to the bowl casing, there being an oil collecting pan on the top of the said peripheral flange plate with an oil duct formed integrally therein and leading therefrom to the interior surface of the bearing adjacent the spindle, there being a housing formed integrally in the bottom of the bowl casing adjacent to bearing opening surrounding the spindle with its outlet above the normal bottom of the bowl casing, and an oil supplying duct or tube extending vertically from below through the bottom of said bowl casing and being secured in the said housing and being adapted to discharge lubricant onto the peripheral flange plate of the bearing.

14. In a centrifugal separator, the combination with a bowl spindle and bearing therefor of a bowl casing provided with an opening to receive the spindle and bearing, the bottom of the bowl casing being thickened around the spindle opening, the said thickened portion around the spindle opening being extended radially and perforated to form a housing for a lubricating tube or duct, and a lubricating tube or duct secured therein and being adapted to discharge lubricant upon the upper end of the bearing.

15. In a centrifugal separator, the combination with the bowl spindle and bearing of a bowl casing, the said bowl casing being provided with a thickened portion to coöperate with the bowl spindle and bearing, the material in the bottom of the bowl casing adjacent the said thickened portion being extended radially and perforated, an oil supplying device secured in the said perforation in the bowl casing and being adapted to discharge lubricant upon the upper end of the bowl spindle bearing within the bowl casing.

16. In a centrifugal separator, the combination with a vertical bowl spindle and bearing therefor, of a bowl casing provided in the bottom thereof with a thickened central portion adapted to support the spindle bearing, the said thickened central portion being of tubular form with its upper end elevated above the normal bottom of the bowl casing, there being a radial extension of the thickened portion of the bowl bottom perforated to provide a passageway for an oil duct or tube whereby the said passageway has its outlet on the interior of the bowl casing raised above the normal bottom of the bowl casing to substantially the height of the bearing housing therein, an oil duct or tube in the said passageway, and means for securing the oil duct or tube in the passageway and closing the passageway to liquids within the bowl casing.

In testimony whereof I have signed my name to this specification, in the presence of two subscribing witnesses, on this 23d day of October, A. D. 1918.

PARKE B. SHEE.